(12) United States Patent
Miura et al.

(10) Patent No.: US 6,499,988 B1
(45) Date of Patent: Dec. 31, 2002

(54) BLOW MOLDING MACHINE

(75) Inventors: Eiki Miura, Tochigi (JP); Hiromichi Kinbara, Tochigi (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 09/147,163

(22) PCT Filed: Feb. 25, 1997

(86) PCT No.: PCT/JP97/00537

§ 371 (c)(1),
(2), (4) Date: Oct. 21, 1998

(87) PCT Pub. No.: WO98/38023

PCT Pub. Date: Sep. 3, 1998

(51) Int. Cl.[7] .............................................. B29C 49/04
(52) U.S. Cl. ........................ 425/532; 425/541; 425/451
(58) Field of Search ........................ 425/451.5, 451.6, 425/541, 532, 535, 451, 453

(56) References Cited

U.S. PATENT DOCUMENTS

| | | | | |
|---|---|---|---|---|
| 3,504,397 A | * | 4/1970 | Langecker | 425/541 |
| 3,860,375 A | * | 1/1975 | Kinslow, Jr. | 425/541 |
| 3,964,852 A | * | 6/1976 | Marfiewicz | 425/451.9 |
| 3,998,576 A | * | 12/1976 | Frohn et al. | 425/541 |
| 4,120,636 A | * | 10/1978 | Appel et al. | 425/451.5 |
| 4,149,450 A | * | 4/1979 | Schleicher | 425/451.6 |
| 4,362,498 A | * | 12/1982 | Harry et al. | 425/541 |
| 4,468,368 A | * | 8/1984 | Hafele | 425/541 |
| 4,545,757 A | * | 10/1985 | Romi | 425/451.6 |
| 4,919,607 A | * | 4/1990 | Martin et al. | 425/535 |
| 5,039,298 A | * | 8/1991 | Takakusaki et al. | 425/504 |
| 5,069,613 A | * | 12/1991 | Inaba et al. | 425/150 |
| 5,478,229 A | * | 12/1995 | Kato et al. | 425/532 |
| 5,551,862 A | | 9/1996 | Allred, Jr. | 425/532 |
| 5,562,934 A | * | 10/1996 | Langos et al. | 425/541 |
| 5,576,034 A | * | 11/1996 | Kiefer et al. | 425/532 |
| 5,695,792 A | * | 12/1997 | Carr | 425/541 |
| 5,759,593 A | * | 6/1998 | Weber et al. | 425/540 |
| 5,851,699 A | * | 12/1998 | Matsubayashi et al. | 425/451.6 |
| 5,975,881 A | * | 11/1999 | Langos et al. | 425/541 |

FOREIGN PATENT DOCUMENTS

| | | |
|---|---|---|
| JP | 50-111166 | 9/1975 |
| JP | 1-127312 | 5/1989 |

OTHER PUBLICATIONS

Patent Abstracts of Japan, JP 06–134846, May 17, 1994.
Patent Abstracts of Japan, JP 59–67020, Apr. 16, 1984.
Patent Abstracts of Japan, JP 09–123262, May 13, 1997.

* cited by examiner

*Primary Examiner*—Jan H. Silbaugh
*Assistant Examiner*—Thu Khanh T. Nguyen
(74) *Attorney, Agent, or Firm*—Oblon, Spivak, McClelland, Maier & Neustadt, P.C.

(57) ABSTRACT

A blow molding machine comprising an extruding device 2, one pair of mold-clamping devices 3, 3', and hammering devices 4, 4' for hammering blow pins 40, 40' respectively into molds 30, 30' in the one pair of mold-clamping devices 3, 3', for blowing, a parison P extruded from the extruding device 2 being clamped by alternately switching the mold-clamping devices 3, 3' and then, the blow pins 40, 40' being hammered into the molds 30, 30' by the hammering devices 4, 4', respectively, wherein the one pair of mold-clamping devices 3, 3' are linearly arranged in the same direction as an opening- and-closing direction of the molds 30, 30' in the mold-clamping devices 3, 3'.

11 Claims, 11 Drawing Sheets

(a)

(b)

(a)

(b)

BLOW MOLDING MACHINE

TECHNICAL FIELD

This invention relates to a blow molding machine usable when a hollow-molded product is manufactured by a blow molding process, and more particularly to a dual reciprocating type blow molding machine having two mold-clamping devices.

BACKGROUND ART

A blow molding machine 100 shown in FIG. 13 is known as a dual reciprocating type blow molding machine having two mold-clamping devices. This blow molding machine 100 includes an extruding device 120, one pair of mold-clamping devices 130, 130', and hammering devices 140, 140' for hammering blow pins 141, 141' respectively into molds 131, 131' in the one pair of mold-clamping devices 130, 130'. For blowing, a parison P extruded from a cross head 121 of the extruding device 120 is clamped by alternately switching the mold-clamping devices 130, 130' and then, the blow pins 141, 141' are hammered into the molds 131, 131' by the hammering devices 140, 140', respectively.

By the way, in the above-mentioned conventional blow molding machine 100, since the one pair of mold-clamping devices 130, 130' are linearly arranged in a perpendicular direction (z-direction of FIG. 13) to an opening- and closing-direction (direction piercing into the paper surface of FIG. 13) of the molds in the mold-clamping devices 130, 130', it is necessary to provide two devices at both sides thereof for taking out a molded product after molding. It is also necessary to provide two systems of equipment for transferring molded products after they are taken out. Moreover, it is necessary that the mold-clamping devices 131, 131' are in standby positions with an interval equal to or more than the width of a platen so that they are not interfered with each other when they stop under the cross head 121. This arrangement makes it necessary to increase a moving quantity of the mold-clamping devices. Accordingly, there is such a problem that an area for installing the machine is inevitably increased. Furthermore, since the hammering devices 141, 141' are provided to perform a hammering operation from above the standby positions of the mold-clamping devices 130, 130', inconveniences arise in view of layout when an increased number of extruding devices 2 are required in accordance with change in composition of the parison P or when an in-mold labeler is installed to perform an in-mold labeling.

DISCLOSURE OF INVENTION

It is, therefore, the first object of the present invention to provide a blow molding machine in which a device for taking out a molded product can be single in system and an area required for installing a machine can be reduced extensively. It is the second object of the present invention to provide a blow molding machine in which extruding devices can be increased in number and in-mold labelers can be arranged without any inconveniences in view of layout.

According to a feature of the present invention, there is provided, in order to achieve the first object, a blow molding machine comprising an extruding device, one pair of mold-clamping devices, and hammering devices for hammering blow pins respectively into molds in the one pair of mold-clamping devices, for blowing, a parison extruded from the extruding device being clamped by alternately switching the mold-clamping devices and then, the blow pins being hammered into the molds by the hammering devices, respectively, wherein the one pair of mold-clamping devices are linearly arranged in the same direction as an opening-and- closing direction of the molds in the mold-clamping devices.

According to a further feature of the present invention, there is provided, in order to achieve the first and second objects, a blow molding machine, wherein the hammering devices are each supported by tie bars or platens in each of the one pair of mold-clamping devices, and the blow pins are hammered respectively into the molds from under the molds by the hammering devices.

In the blow molding machine of the present invention, the parison extruded from the extruding device is clamped by alternately switching the one pair of mold-clamping devices and the blow pins are hammered respectively into the molds by the hammering devices for blowing. Since the one pair of mold-clamping devices are linearly arranged in the same direction as the opening-and-closing direction of the molds in the mold-clamping devices, the taking-out device can be provided only on one side of the mold-clamping devices. Accordingly, a molded product can be taken out by a single system and an area required for installing the machine can be reduced extensively.

In the blow molding machine of the present invention, since the hammering devices are each supported by the tie bars or the platens in each of the mold-clamping devices and the blow pins are hammered from under the molds, no inconvenience arises in view of layout when additional number of the extruding devices are employed in accordance with change in composition of the parison or when an in-mold labeler is installed to perform an in-mold labeling.

BRIEF DESCRIPTION OF DRAWINGS

FIG. 6(a) is a side view thereof, and FIG. 6(b) is a sectional view taken on line C—C and viewed in a direction as indicated by arrows of FIG. 6(a);

FIG. 8(a) is a side view thereof, and FIG. 8(b) is a sectional view taken on line A—A and viewed in a direction as indicated by arrows of FIG. 3;

BEST MODE FOR CARRYING OUT THE INVENTION

Figure 1:
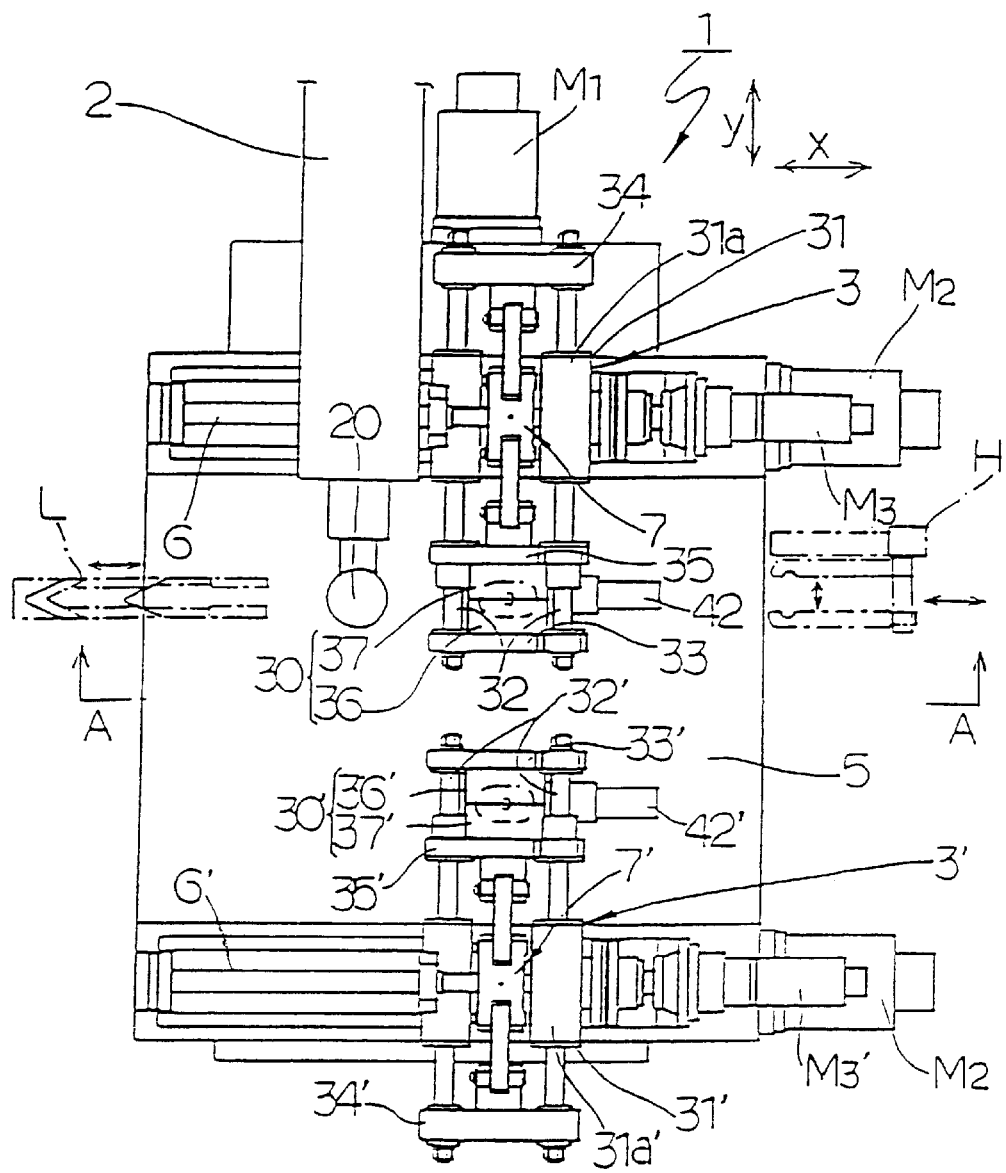
FIG. 1 is a schematic plan view of a main portion showing the first embodiment of a blow molding machine according to the present invention.

One embodiment of the present invention will be described hereinafter with reference to the accompanying drawings.

FIGS. 1 through 9 show the first embodiment of a blow molding machine according to the present invention. In these Figures, reference numeral 1 denotes a blow molding machine; P, a parison; L, an in-mold labeler; and H, a taking-out device, respectively.

Figure 2:
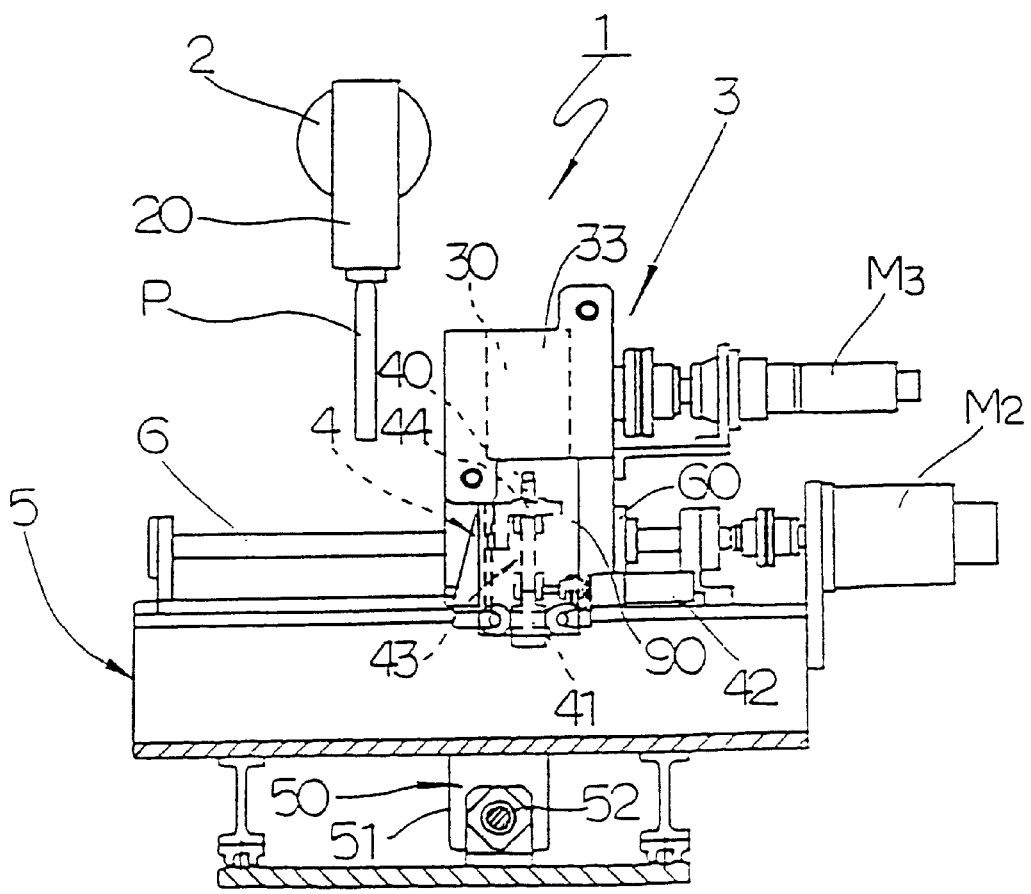
FIG. 2 is a sectional view taken on line A—A and viewed in a direction as indicated by arrows of FIG. 1.
Figure 3:
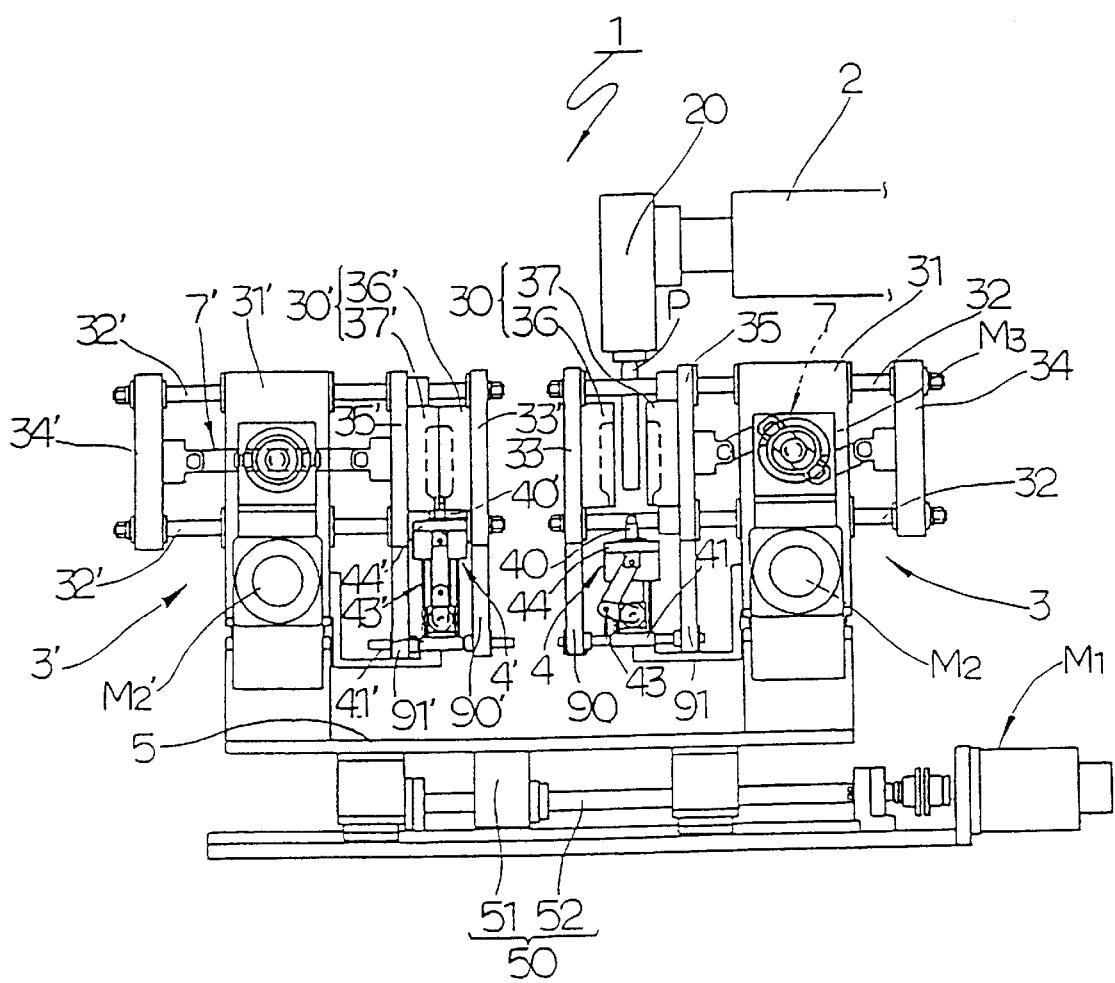
FIG. 3 is a schematic side view of the main portion of the blow molding machine according to the first embodiment.

As shown in FIGS. 1 through 3, the blow molding machine 1 includes an extruding device, one pair of mold-clamping devices 3, 3', and hammering devices 4, 4' for hammering blow pins 40, 40' respectively into molds 30, 30' in the one pair of mold-clamping devices 3, 3'. For blowing, the parison P extruded from the extruding device 2 is clamped by alternately switching the mold-clamping devices 3, 3 and then, the blow pins 40, 40' are hammered into the molds 30, 30' by the hammering devices 4, 4', respectively.

The extruding device 2 includes a cross head 20 on a distal end portion thereof. The extruding device 2 extrudes the parison P downwardly from the cross head 20.

The mold-clamping devices 3, 3' are linearly arranged on a main base plate 5 at a predetermined interval in the same direction as the opening- and- closing direction of the molds 30, 30' in the mold-clamping devices 3, 3'. Under the main base plate 5, a ball screw 50 driven by a motor M1 is disposed. The main base plate 5 is fixed to a ball nut 51 of the ball screw 50 such that the main base plate 5 can move in an axial direction (y-direction of FIG. 1) of a ball shaft 52.

Next, the mold-clamping devices 3, 3' are described. The mold-clamping devices 3, 3' have basically the same construction except that the tie bars and the platens are arranged in symmetrical relation as shown in FIGS. 1 through 3. Therefore, only the mold-clamping device 3 is described and description of the other mold-clamping device 3' is omitted by affixing the mark "'" to the reference numeral in the mold-clamping device 3.

Figure 4:
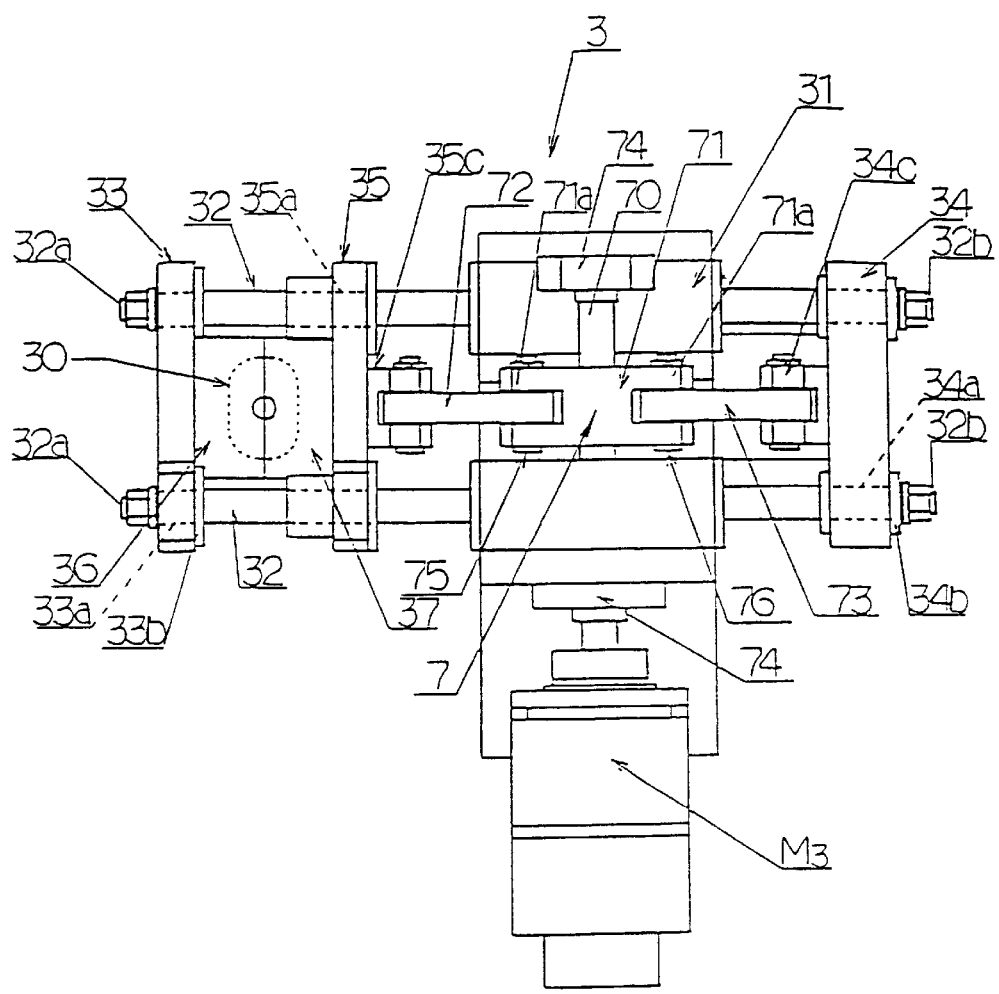
FIG. 4 is a plan view of a main portion showing mold-clamping devices in the blow molding device according to the first embodiment.

As shown in FIGS. 3 and 4, the mold-clamping device 3 includes a device body 31, tie bars 32 horizontally supported on the device body 31 for movement forwardly and backwardly, a front platen 33 provided on front portions of the tie bars 32, a rear platen 34 provided on rear portions of the tie bars 32, and a movable platen 35 provided on the tie bars 32 in an opposing relation with the front platen 33 and for movement forwardly and backwardly. The mold-clamping device 3 further includes split molds 36, 37 on the opposing sides of the front platen 33 and the movable platen 35.

The device body 31 chiefly comprises a frame member 31a fixed to a ball nut 60 of a ball screw 6 which is driven by a servo motor M2. The tie bars 32 are horizontally supported on diagonally located corner portions of the frame member 31a for movement forwardly and backwardly. Annexed to the device body 31 are a crank mechanism 7, and an electric motor M3 for transmitting a driving force to a crank shaft 70 of this crank mechanism 7. The movable platen 35 and the rear platen 34 are connected to a crank arm 71 of the crank mechanism 7 through a connecting rods 72, 73, respectively.

As shown in FIG. 4, the crank mechanism 7 chiefly comprises the crank shaft 70, the crank arm 71 fixed to a generally central portion of the crank shaft 70 in an axial direction thereof, and rods 72, 73 fixed to the crank arm 71. Opposite end portions of the crank shaft 70 are turnably supported by pillow blocks 74 fixed to the device body 31. A driving shaft of the servo motor M3 is connected to one end portion of the crank shaft 70 through a reduction unit. Owing to this arrangement, the crank mechanism 7 is actuated by driving the servo motor M3.

The crank arm 71 includes arm portions 71a which are arranged in rotational symmetry at 180 degrees with respect to the crank shaft 70. The connecting rods 72, 73 are connected to distal end portions of the arm portions 71a through connecting pins 75, 76, as later described, respectively. When the arm portions 71a and the connecting rods 72, 73 are aligned, the split molds 36, 37 are brought into contact with each other to generate a prescribed cramping force.

Figure 5:
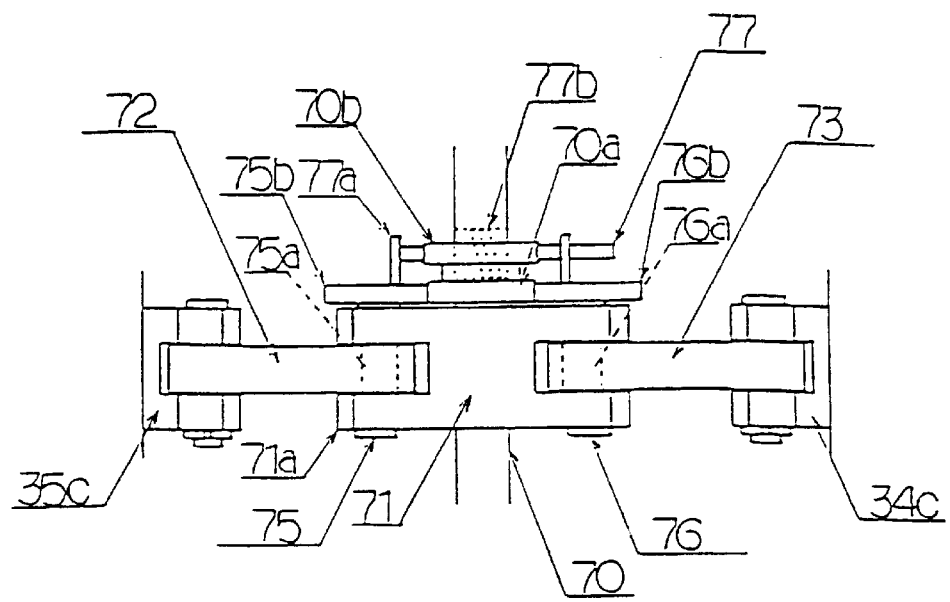
FIG. 5 is a plan view showing a mechanism for adjusting an expanding-and-contracting length of a crank mechanism of the mold-clamping device.
Figure 6:
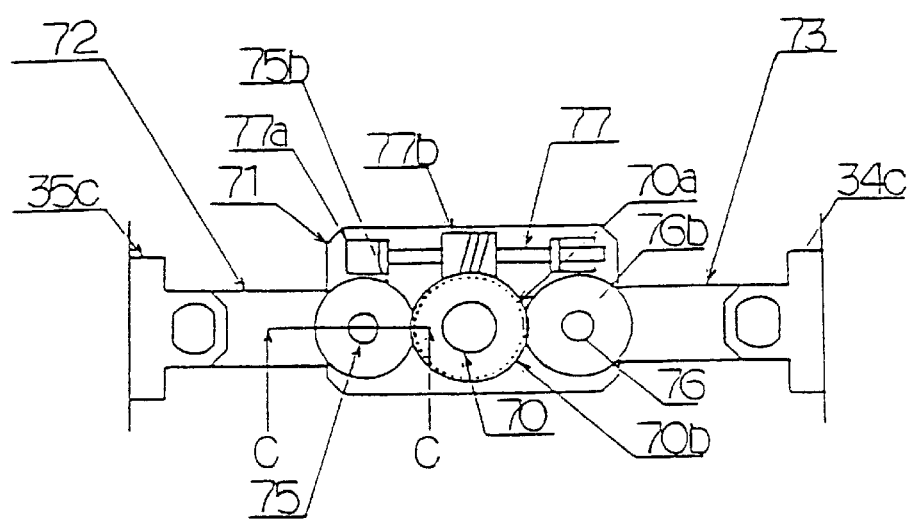
FIGS. 6(a)–6(b) are views showing the expanding-and-contracting length adjusting mechanism.
Figure 6:
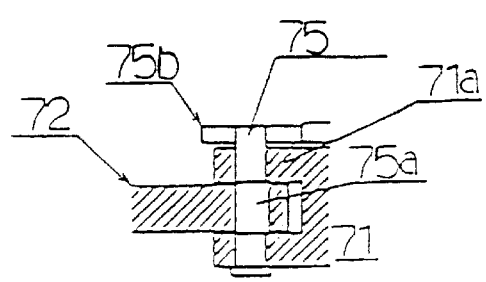

As shown in FIGS. 5 and 6($b$), the connecting pins 75, 76 for connecting the crank arm 71 and the connecting rods 72, 73 together are provided at axially intermediate portions thereof with eccentric portions 75a, 76a each having a larger outside diameter than that of the opposite end portions and displaced in axis from that of each opposite end portion. The connecting pins 75, 76 are provided respectively with gears 75b, 76b fixed respectively to distal end portions of the connecting pins 75, 76. The opposite end portions of the connecting pins 75, 76 are turnably supported by the arm portions of the crank arm 71, and the eccentric portions are inserted into insertion cavities (not shown) of the connecting rods.

As shown in FIGS. 5 and 6($a$), a hand shaft 77 is horizontally and rotatably supported by a support member 77a at a portion of a side surface portion of the crank arm 71 under (above in FIG. 6($a$)) the gears 75b, 76b. A worm gear 77b is fixed to an axially intermediate portion of the hand shaft 77. On the other hand, a gear 70a meshed with the gears 75b, 76b and a worm wheel 70b fixed to the gear 70a and meshed with the worm 77b are arranged on the crank shaft 70 for rotation relative to the crank shaft 70. The hand shaft 77 is rotated to cause the connecting pins 75, 76 to rotate through the worm 77b, the worm wheel 70b, the gear 70a, and the gears 75b, 76b. This varies the distance from the axis of the crank shaft 70 to the axis of the eccentric portions 75a, 75b, so that the expanding length of the crank mechanism 7 is adjusted. By doing so, the crank arm 71 and the connecting rods 72, 73 can be expanded linearly irrespective of the dimension and configuration of the mold. Here, the eccentric portions 75a, 76a, the gears 75b, 76b, 70a, the hand shaft 77, the worm 77b, and the worm wheel 70b constitute a mechanism for adjusting the expanding length of the crank mechanism 7.

As shown in FIG. 4, male screw portions 32a, 32b are provided on front and rear end portions of the tie bars 32, respectively. Bushes 33b, 34b of front and rear platens 33, 34 as later described are threadingly engaged with the male screw portions 32a, 32b, respectively.

The front platen 33, the rear platen 34, and the movable platen 35 are each formed of a regular square plate-like member in a front view. Insertion cavities 33a, 34a, 35a for inserting the tie bars 32 therein are provided at diagonal corner portions of the platens. The front platen 33, the rear platen 34, and the movable platen 35 can be arranged on the tie bars 32 so that the tie bars 32 are symmetrically located with respect to the centers of the split molds 36, 37.

Bushes 34b having female screw portions (not shown) corresponding to the male screw portions 32a of the tie bars 32 are provided at the insertion cavities 33a, 34a of the front and rear platens 33, 34. Owing to this arrangement, the platens 33, 34 can be fixed to prescribed positions of the front and rear end portions of the tie bars. A pulley 80 (see FIG. 7) is fixed to a front surface portion of the bush 33b of the front platen 33. Support jigs 34c, 35c for supporting one end portions of the connecting rods 72, 73 at the same height as the axis of the crank shaft 70 through the pins are fixed to surface portions of the rear platen 34 and the movable platen 35 opposing the device body 31.

Figure 7:
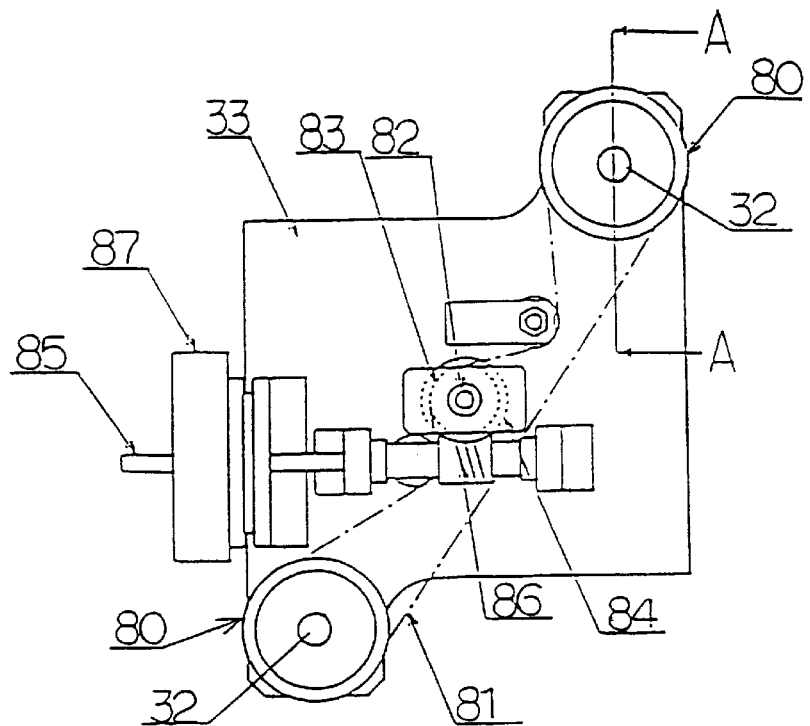
FIG. 7 is a front view showing a mechanism for adjusting a fixing position of a front platen of a mold-clamping device in the blow molding machine according to the first embodiment.
Figure 8:
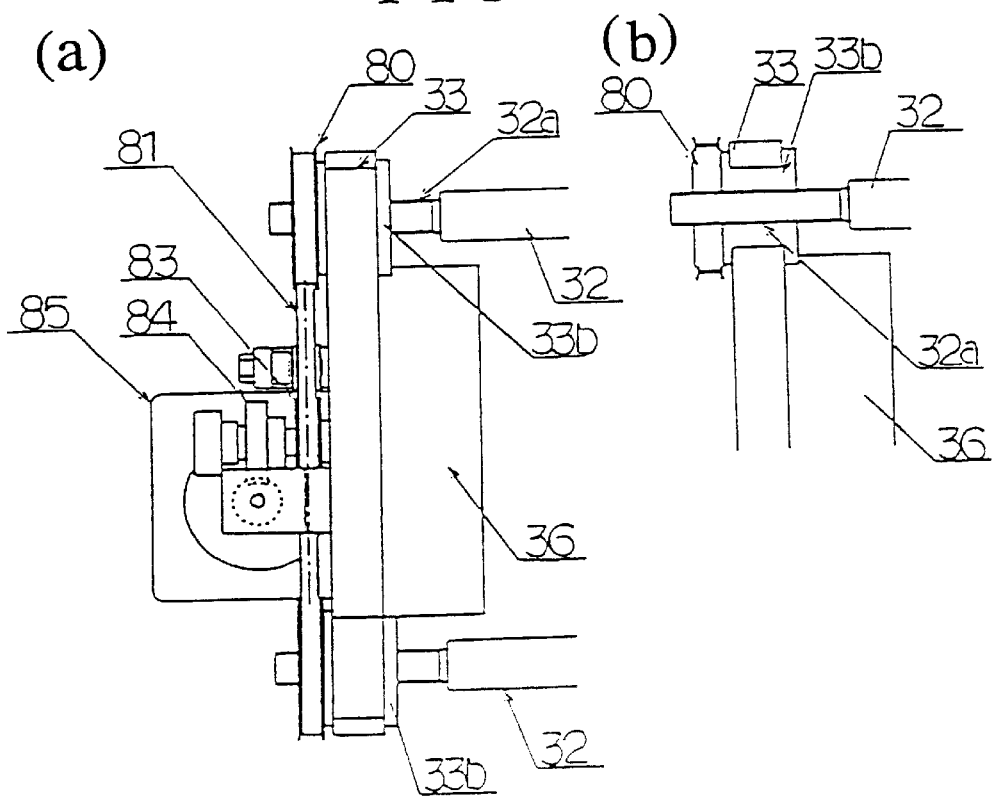
FIGS. 8(a)–8(b) are views showing the fixing position adjusting mechanism.

As shown in FIGS. 7 and 8(a)–8(b), an endless timing belt 81 is strained over each pulley 80 fixed to the bushes 33b of the front platen 33. A forwardly horizontally projecting shaft 82 is turnably provided generally on the center of the front surface portion of the front platen 33. A driving pulley 83 and a worm wheel 84 are fixed to this shaft 82. On a front surface portion of the front platen 33, a hand shaft 85 is horizontally and turnably supported by a support member such that the hand shaft 85 is located below the worm wheel 84. A worm 86 meshed with the worm wheel 84 is fixed to an axially intermediate portion of the hand shaft 85. A counter 87 is attached to one end portion of the hand shaft 85. By doing so, a fixed position of the front platen 33 can be indicated by an amount of movement by this counter 87. Here, the pulley 80, the timing belt 81, the shaft 82, the driving pulley 83, the worm wheel 84, the hand shaft 85, the worm gear 86, and the counter 87 constitute a fixed position adjusting mechanism 8 capable of fixing the front platen 33 to the tie bar 32 at a desired position of a front end portion of the tie bar 32.

Figure 9:
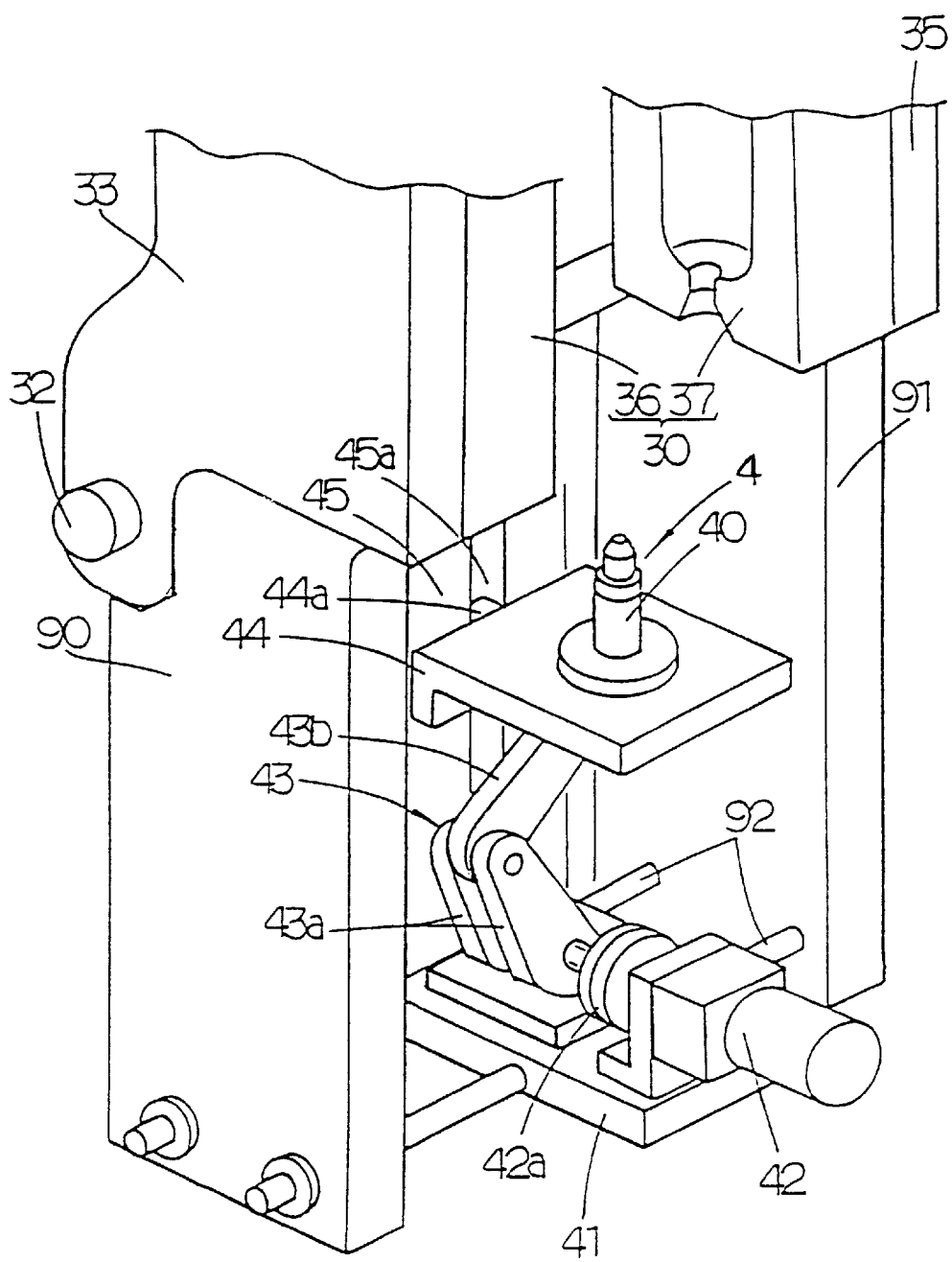
FIG. 9 is a perspective view of a main portion showing a hammering device in the blow molding machine according to the first embodiment.

As shown in FIG. 9, the front platen 33 and the movable platen 35 are integral with support plates 90, 91, respectively. The hammering device 4 is supported by the support plates 90, 91 through two shafts 93, 93 disposed below the support plates 90, 91.

The hammering device 4 includes a base plate 41 fixed to generally central portions of shafts 92, a servo motor 42 fixed to the top of the base plate 41, a toggle mechanism 43 capable of being bent and stretched by the servo motor 42, and the blow pin 40 capable of being moved upwardly and downwardly in response to the bending and stretching motion of the toggle mechanism 43.

A driving shaft of the servo motor 42 is connected to a first joint portion of a first operating rod 43a of the toggle mechanism 43 through a reduction unit 42a. Owing to this arrangement, the first operating rod 43a and a second operating rod 43b jointed to the first operating rod 43a through a pin are bent and stretched in response to a driving operation of the servo motor 42.

The blow pin 40 is fixedly positioned to the top of a blow pin base 44 which is fixed to an upper end portion of the second operating rod 43b of the toggle mechanism 43, such that a compressed air supplied through a compressor (not shown) can be blown generally vertically from below the molds 36, 37. A guide projection 44a projects from a side surface of the blow pin base 44. As the guide projection 44a is vertically moved along a guide groove 45a of a guide plate 45 erected from the base plate 41, the blow pin 40 can be moved upwardly and downwardly with a high degree of accuracy.

The blow molding machine 1 includes a control unit (not shown) having a sequencer. A sequence of operations of the extruding device 2, the mold-clamping devices 3, 3', and the hammering devices 4, 4' can be controlled in according with a control flow (see the operation time chart of FIG. 10) of this sequencer. Output from each servo motor is input into the control unit through an encoder. This makes it possible to control the positioning of the blow pin 40.

Operation of the blow molding machine 1 is described next with reference to FIG. 10.

First, in order that a required clamping force will be generated at a position where the crank arm 71 and the connecting rods 72, 73 are brought into alignment in match with various conditions such as dimension, size of the split molds 36, 37, blow pressure, etc., the fixed position of the front platen 33 is preliminarily adjusted at the front end portions of the tie bars 32 by the fixed position adjusting mechanism 8, or the positions of the movable platen 35 and the rear platen 34 are preliminarily adjusted by the expanding and contracting length adjusting mechanism of the crank mechanism 7. The hammering power of the hammering device 4 can be estimated based on an angle of the toggle mechanism 43 and a thrust force for stretching the toggle mechanism 43. Based on this estimation, the way how to stretch the toggle mechanism 43 or the torque of the servo motor 42 is established. The positioning of the center of the blow pin 40 is performed by loosening and releasing the blow pin 40 from the blow pin base 44 so that the blow pin 40 can move on the top of the blow pin base 44, then, a hammering operation is carried out carefully to bring the brow pin 40 and the split molds 36, 37 into abutment with each other while confirming rattling or play of the blow pin 40, and finally, the blow pin 40, the center of which is in alignment with the mold 30, is fixedly positioned on the top of the blow pin base 44. The establishment of the hammering device 4' is preliminarily performed in the same manner as the hammering device 4. By adjusting the hammering height as previously mentioned, the adjusting operation is finished. The positioning of the center of the blow pin 40 is very simple and the position is fixed in an actual hammering state. Accordingly, reliability is high, cost is low, and operation can be made easily and rapidly.

Thereafter, the crank mechanism 7 is established such that the connecting rods 72, 73 are bent relative to the arm portion 71a of the crank arm 71, and the driving motor M1 is driven to set the parison P so as to be hung down within the cavity of the split molds 36, 37 as shown in FIG. 3. By doing so, an initial setting is finished.

Then, the parisons P are successively hung down from the cross head 20 of the extruding device 2. Subsequently, the driving motor M2 is driven to move the mold-clamping device 3, which is in its open position, leftwardly (leftward in the x-direction of FIG. 1).

When the parison P is extruded a prescribed length, the servo motor M3 is driven, and the driving force of the servo motor M3 is transmitted to the crank shaft 70 after it is reduced in speed by the reduction unit. Then, the crank arm 71 fixed to the crank shaft 70 is also rotated in response to rotation of the crank shaft 70. As a consequence, the connecting rods 72, 73 connected to the arm portion 71a of the crank arm 71 through the connecting pins 75, 76 are stretched outwardly from the center of the crank shaft 70. In response to the stretching of the connecting rods 72, 73, the connecting rods 72, 73 cause the rear platen 34 and the movable platen 35 move away each other through the support jigs 34c, 35c.

Then, the movable platen 35 approaches the parison P along the tie bars 32. With respect to the front platen 33, as the tie bars 32 themselves are moved backwardly in accordance with the backward movement of the rear platen 34. Consequently, the split molds 36, 37 approach the parison P. Lastly, split surfaces of the split molds 36, 37 are abutted with each other to clamp the parison P therebetween. For performing the in-mold labeling, the in-mold labeler L is inserted when the split molds 36, 37 are being closed.

Upon the completion of the clamping operation, the parison P is cut by a parison cutter (not shown).

Then, as soon as the cutting operation for the parison P is finished, the servo motor M2 is driven to cause a ball nut 60 fixed to the device body 31 to move horizontally. In response to this movement, the mold-clamping device 3 moves rightwardly (rightward in the x-direction of FIG. 1) when the split molds are in their clamping positions to cause the split molds 36, 37 to escape from the parisons P which are normally successively extruded from the cross head 20 of the extruding device 2.

After the completion of movement of the mold-clamping device 3, the motor M1 is driven and the main base plate 5 is moved inwardly (upwardly in the y-direction of FIG. 1) to a prescribed position where it is stopped. Then, the mold-clamping device 3 is switched to the other mold-clamping device 3'.

On the other hand, action of the hammering device 4 is started at the same timing as the cutting operation for the parison P. The servo motor 42 is driven to cause rods 43a, 43b of the toggle mechanism 43 to be gradually stretched. Consequently, the guide projection 44a of the blow pin base 44 attached to upper end portions of the toggle mechanism are raised along the guide groove 45a of the guide plate 45. Then, the blow pin 40 approaches the split molds 36, 37 which are in their clamped positions.

Subsequently, the blow pin 40 is inserted into an insertion mouth of the clamped split molds 36, 37 from below to perform a blow molding by discharging a pressurized air. In this blow molding machine 1, the hammering device 4 is supported by the support plates 90, 91 which are integrally provided on the front platen 33 and the movable platen 35. Since the sequence of operations of the hammering device 4 hereinbefore described can be performed during the escaping operation of the mold-clamping device 3, one molding cycle can be reduced extensively.

When the blowing operation is performed by the hammering device 4, since the inside diameter of the mouth portion of the molded product is formed by the blow pin 40, it is, basically, not required to process the inside diameter later. Further, the insertion position of the blow pin 40 can be adjusted by expansion and construction of the toggle mechanism 43 as previously described, and adjustment such as the biting off of the mouth portion of the molded product, etc. can be performed.

In the blowing process by the hammering device 4, the mold-clamping device 3' moves leftwardly (leftward in the x-direction of FIG. 1) with the mold 30' being in an open position, and the mold-clamping device 3' stops below the cross head 20 of the extruding device 2. Thereafter, the parison P is clamped by the mold 30' in the same manner as the mold-clamping device 3. Then, after the blowing operation is started by cutting the parison with the parison cutter and hammering the blow pin 40', the mold-clamping device 3' moves rightwardly (rightward in the x-direction of FIG. 1). Simultaneously with the complement of this movement, the main base plate 5 moves this side (downward in the y-direction of FIG. 1). Thereafter, the taking-out device H advances leftwardly (leftward in the y-direction of FIG. 1) with its chuck open and starts preparation for taking out a product molded by the mold-clamping device 3.

After the completion of movement of the main base plate 5 and after the completion of preparation of a taking out operation made by the taking-out device H, the blowing operation and the exhausting operation are ended by the hammering device 4 of the mold-clamping device 3. Then, the contracting operation of the crank mechanism 7 is started to cause the split molds 36, 37 to start opening.

Figure 10:
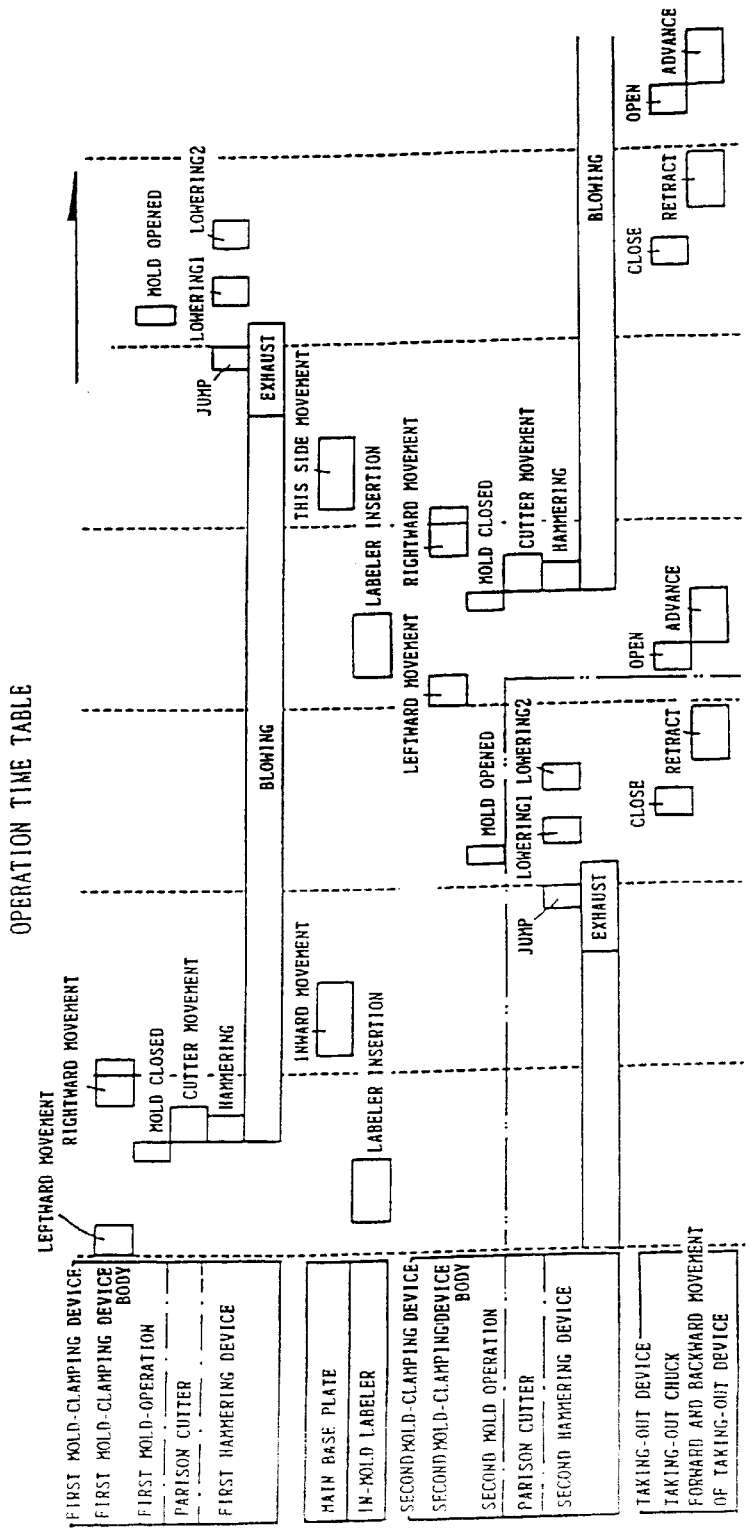
FIG. 10 is a view showing a time chart of action of the blow molding machine according to the first embodiment.

In FIG. 10 (as well as in FIG. 12), a jumping operation of the hammering device of each mold-clamping device is a returning operation of the blow pin, this returning operation being effected during or after the end of exhausting operation which is performed after the end of the blowing operation, from the inserted position by an under-cut portion, if this is the case (as often seen, for example, in bottles for domestic-use detergent in which the bottom portion of the bottle container is of a bottom-up construction), so that the under-cut portion will not be damaged or deformed by being forcedly removed from the mold when the mold is open. Owing to this operation, the molded product can freely move in the axial direction of the blow pin when the mold is opened. Thus, the molded product is prevented from being damaged and/or deformed. For this reason, in case the molded product is in an under-cut condition, this jumping operation can be omitted.

When the split molds 36, 37 are opened good enough, the blow pin 40 is caused to move to a delivery position with respect to the taking-out device H by the bending operation of the toggle mechanism 43. At the delivery position, the chuck catches the molded product supported by the blow pin 40. Then, the toggle mechanism 43 is further bent to separate the blow pin 40 and the molded product from each other. Thereafter, the chuck of the taking-out mechanism H is retracted to take out the molded product. By doing so, one molding cycle by the mold-clamping device 3 is completed.

After the completion of one molding cycle by the mold-clamping device 3, the device body 31 and the hammering device 4 are returned to their initial states (the device body 31 is returned to below the extruding device 2, and the toggle mechanism 43 of the hammering device 4 is returned to the bending state), respectively, so that a new molding cycle is started again. It should be noted that such a molding cycle may be started at the same time the chuck of the taking-out device H is retracted.

After a blowing operation in the new molding cycle by the hammering device 4 of the mold-clamping device 3 is started, the main base plate 5 is moved towards the inner side (upward in the y-direction of FIG. 1) again. Then, the blowing and exhausting operations by the mold-clamping device 3' are finished, and the molded product is taken out by the taking-out device H in the same procedure as in the mold-clamping device 3 mentioned above. By doing so, one molding cycle by the mold-clamping device 3' is completed.

By repeating the above operations, molded products are produced successively.

As described hereinbefore, since the blow molding machine 1 according to this embodiment is designed such that the one pair of mold-clamping devices 3, 3' are linearly arranged in the opening- and- closing direction of the molds 30, 30' in the mold clamping devices 3, 3', only one taking-out device H is good enough for taking out a molded product after the molding operation. Therefore, the taking out operation of a molded product can be performed by a single system, and the area required to install the machine can be reduced extensively.

Further, since the hammering devices 4, 4' are supported by the platens in the mold-clamping devices 3, 3' and the blow pins 40, 40' are hammered from below the molds 30, 30', no inconvenience arises in view of layout when an employment of additional extruding devices is required (see reference numeral 2' of FIG. 11) due to change in composition of the parison, etc., or when the in-mold labeler L is arranged in order to perform an in-mold labeling operation.

Furthermore, since the hammering devices 4, 4' are integral with the front platens 33, 33' and the movable platens 35, 35' and the sequence of operations made by the hammering devices 4, 4' can be performed during the escaping operation of the mold-clamping devices 3, 3', the molding cycle can be reduced extensively.

Moreover, since the hammering devices 4, 4' are integral with the front platens 33, 33' and the movable platens 35, 35', the centering accuracy can be enhanced when the blow pins 40, 40' are hammered.

Further, since the front platens 33, 33' and the movable platens 33, 33' are trimmed with respect to the base plates 41, 41' of the hammering devices 4, 4' loads to be applied to the platens 33, 33' and 35, 35' when the blow pins 40, 40' are hammered are offset by the power relation between action and reaction in the support plates 90, 90' and 91, 91', the loads applicable during the hammering operation are reduced and the devices can be designed smaller to that extent.

Furthermore, since the crank mechanisms 7, 7' are employed in the mold clamping devices 3, 3' for opening and closing the split molds 36, 36' and 37, 37', it is not necessary to normally apply a hydraulic oil which is necessary in a hydraulic operating piston cylinder mechanism. Accordingly, the running cost can be reduced compared with the conventional technique, and the various problems arising from the use of hydraulic devices can be obviated.

Moreover, since the torque load required for clamping is low, a small-sized motor of a low torque such as the servo motor M3 can be employed. Thus, the devices can be designed smaller to that extent.

Further, since a uniform clamping force can be applied to the abutment surfaces of the split molds 36, 37 and 36', 37' by arranging the tie bars 32, 32' diagonally to the center of each of the split molds 36, 37 and 36', 37', an excellent hollow molded product having less burr can be manufactured. Since the front platens 33, 33' and the movable platens 35, 35 where the split molds 36, 37 and 36', 37' are arranged can be reduced in weight and size, the devices themselves can be designed smaller and lighter. Thus, the requirements for energy saving and space saving can be fulfilled.

Moreover, since the split mold can be clamped in the state that the crank arm and the connecting rod are stretched linearly by the fixed position adjusting mechanism of the front platen and the expanding and contacting length adjusting mechanism of the crank mechanism, a molding operation can be performed by a uniform clamping force in a stable manner irrespective of the size and configuration of the mold.

Figure 11:
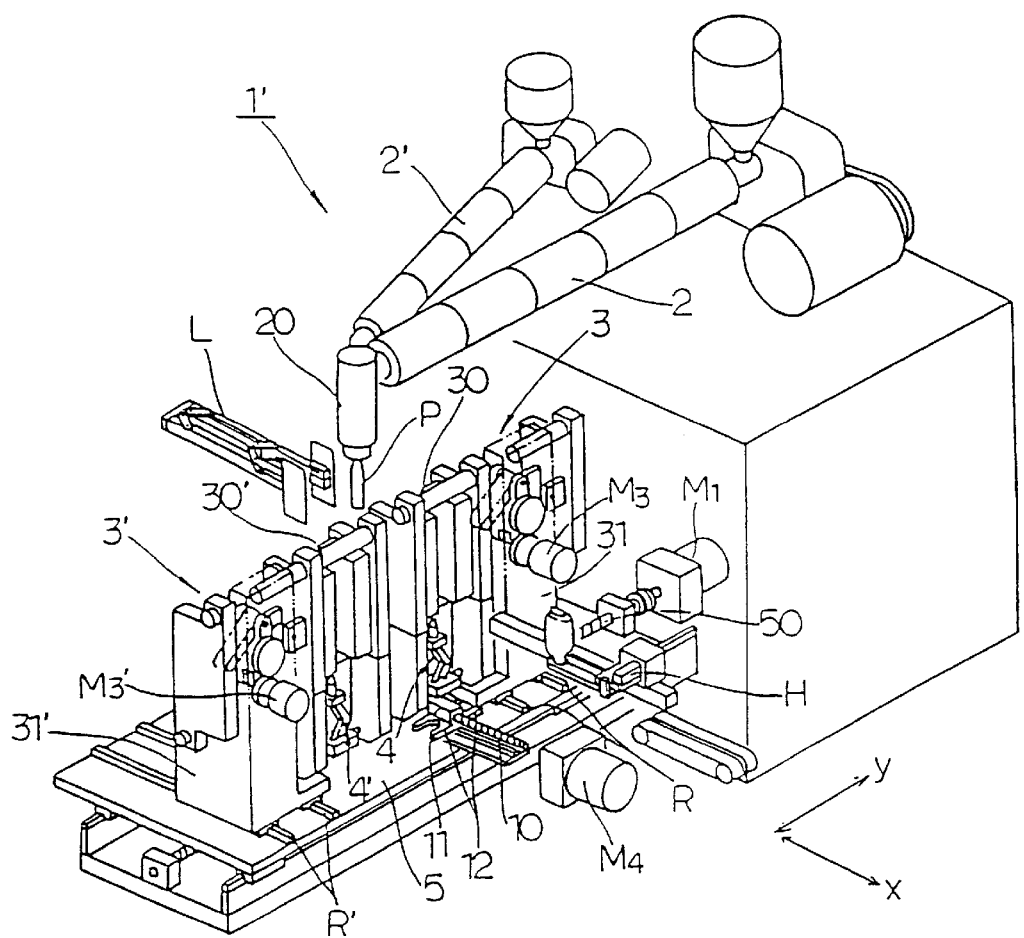
FIG. 11 is a perspective view showing the second embodiment of a blow molding machine according to the present invention.

FIG. 11 shows the second embodiment of a blow molding machine according to the present invention. In this Figure, reference numeral 1' denotes a blow molding machine; and 2', an extruding device additionally employed in accordance with change in composition of the parison, respectively. Since the blow molding machine 1 of this embodiment is the same in construction as the blow molding machine of the first embodiment only excepting a moving mechanism for escaping the mold-clamping devices, description is made only with respect to the moving mechanism and description on the remaining portions is omitted simply by denoting identical parts by identical reference numerals as the blow molding machine 1 of the first embodiment.

As shown in FIG. 11, in the blow molding machine 1, rails R, R' are laid on a main base plate 5 in the x-direction and a ball screw 10 driven by a motor M4 is provided on the center of the rails R, R' and in parallel to the rails R, R'. A ball nut 11 of this ball screw 10 is provided with an engagement portion 12 having a recess which is open in the y-direction.

On the other hand, device bodies 3 1, 3 1' of mold-clamping devices 3, 3' are arranged in such a manner as to be capable of traveling on the rails R, R'. The device bodies 31, 31' are each provided at a lower end portion thereof with an engagement pin (not shown) corresponding to the engagement portion 12 of the ball nut 11.

When the main base plate 5 moves towards inwardly or this side (y-direction of FIG. 11), the engagement pin of either the device body 31, or 31' is engaged with the engagement portion 12 and locked. At that time, the motor M4 is driven to cause the movement of selected one of the device bodies 31, 31' in the x-direction.

Figure 12:
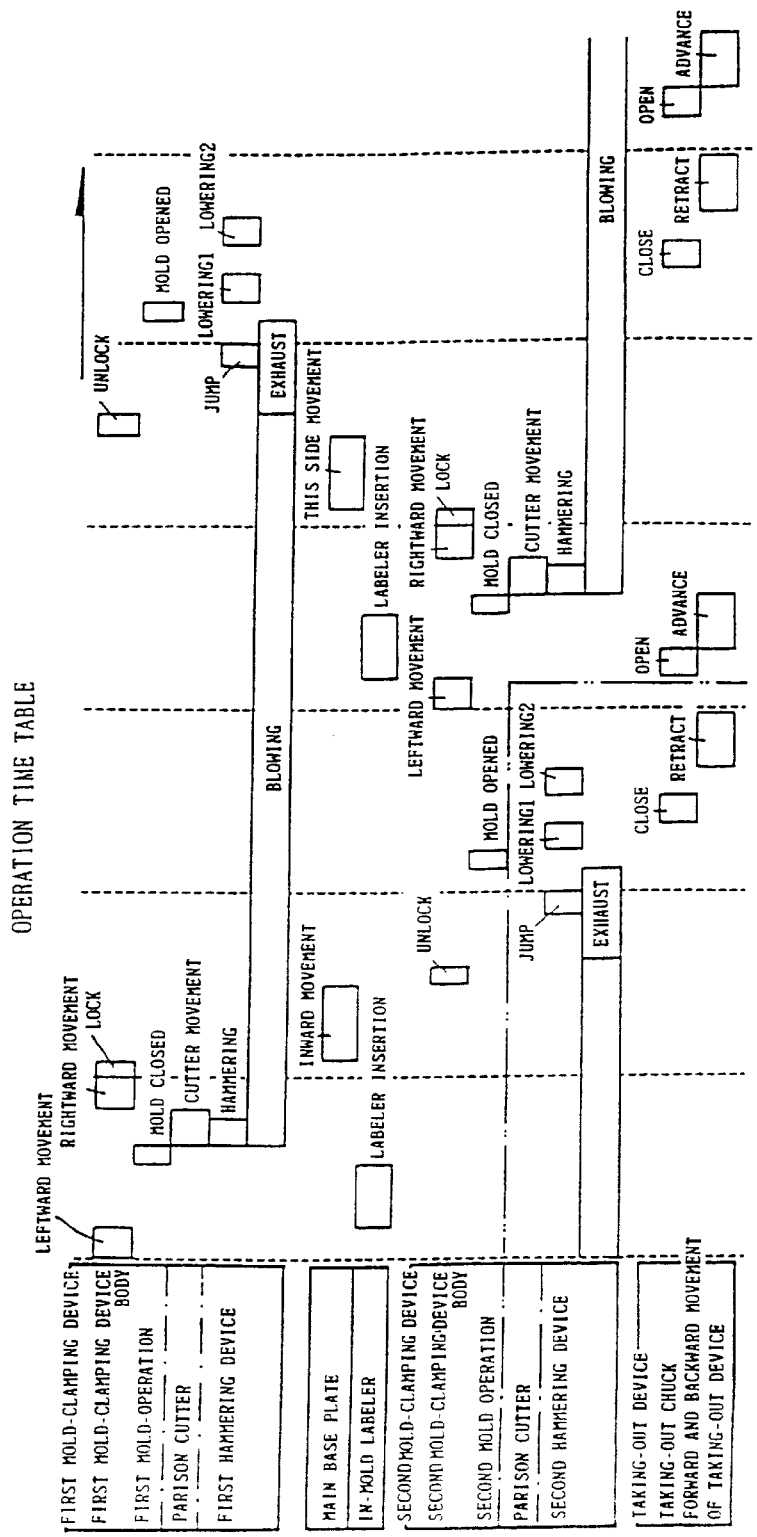
FIG. 12 is a view showing a time chart of action of the blow molding machine according to the second embodiment.
Figure 13:
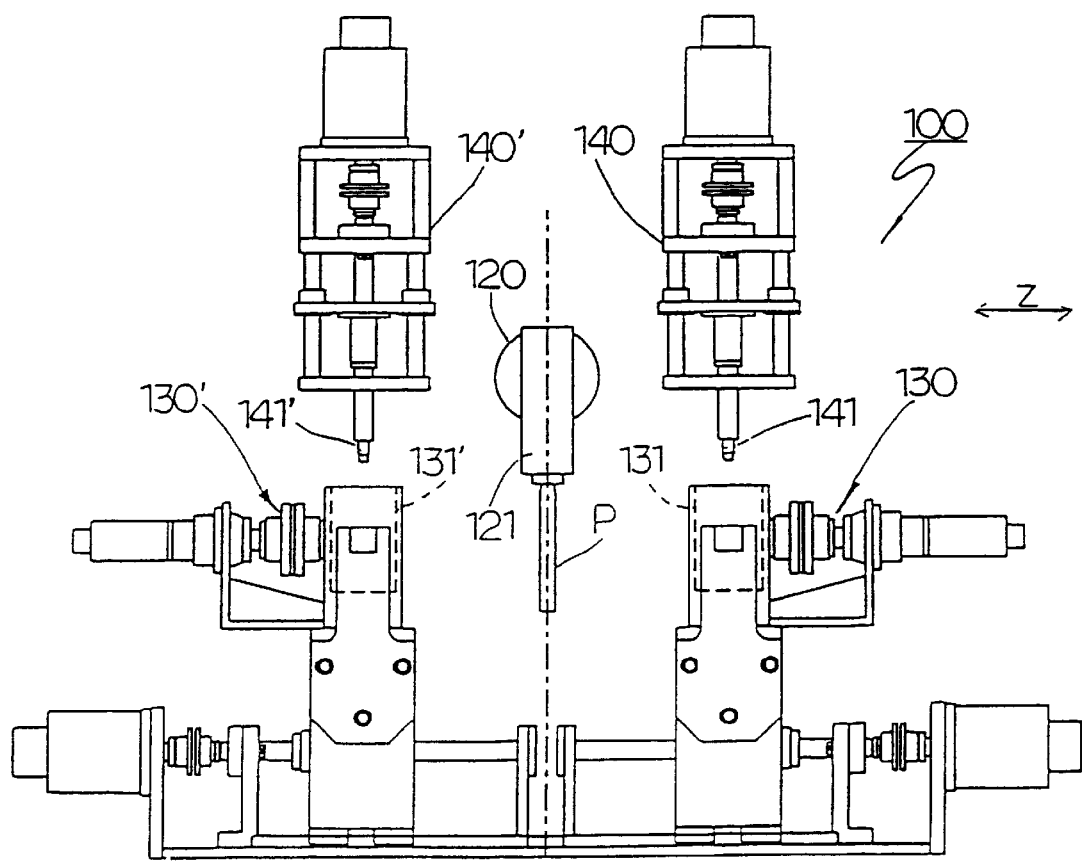
FIG. 13 is a front view of a main portion showing the conventional blow molding machine.

Operation of the blow molding machine 1' according to this second embodiment can be performed in accordance with the operation time chart of FIG. 12, for example. This operation time chart is the same as the operation time chart (see FIG. 10) for the blow molding machine 1, only except that the engagement recess 12 is engaged with the engagement pin.

Since the blow molding machine 1' according to this embodiment is designed such that the moving mechanism for escaping the mold-clamping devices 3, 3' can be performed only by driving the motor M4, the devices can be designed further smaller in addition to the effect of the blow molding machine 1 according to the first embodiment.

It should be noted that the blow molding machine according to the present invention is not limited to the blow molding machines 1, 1' of the above embodiments but that it can be changed, where necessary, in size and configuration without departing from the objects of the present invention.

For example, in the blow molding machines of the above embodiments, the bending and stretching operations of the toggle mechanism for moving the blow pin upwardly and downwardly are performed by the ball screw driven by the servo motor. In the alternative of the mechanism for bending and stretching the toggle mechanism, other mechanisms such as a belt mechanism, a pinion and rack mechanism, and the like may be employed.

In the blow molding machines of the above embodiments, the hammering device is supported by a support plate integral with the front platen and the movable platen. In the alternative, the hammering device may be supported directly by the hammering device tie bars.

Further, in the blow molding machines of the above embodiments, both the fixed position adjusting mechanism and the expanding and contracting length adjusting mechanism are employed in each mold-clamping device. In the alternative, either of the mechanisms may only be employed, or, in case no change is made with respect to the mold, the fixed position adjusting mechanism and the expanding and contracting length adjusting mechanism are not necessarily employed.

Although, in the blow molding machine according to the present invention, it is particularly preferred to employ an electric motor as a power source for driving the crank mechanism as in the blow molding machines of the above embodiments, the crank mechanism may be driven by a power source which is driven by fuel such as kerosene, gasoline, heavy oil, and the like.

Although, in the blow molding machine according to the present invention, it is particularly preferred that the opening and closing mechanism for the split molds is performed by a crank mechanism as in the blow molding machines of the above embodiments, other opening and closing mechanisms may be employed as the opening an closing mechanism for the split mold.

Industrial Applicability

According to the blow molding machine of the present invention, the following effects can be exhibited.

According to the blow molding machine, since the one pair of mold-clamping devices are linearly arranged in the same direction as the opening and closing direction of the mold in the mold clamping device, a taking-out device can be provided on only one side of the one pair of the mold-clamping devices. Accordingly, the taking out operation of a molded product can be performed by a single system, and the area required for installing the machine can be reduced extensively compared with the conventional technique.

According to the blow molding machine, in addition to the above effect, additional number of the extruding devices can be employed in accordance with change in composition of the parison and an in-mold labeling can be performed without any inconvenience in view of layout.

What is claimed is:

1. A blow molding machine comprising:

an extruding device configured to extrude a parison;

first and second mold-clamping devices configured to clamp first and second pairs of mold halves, respectively, and positioned in a first linear direction, said first and second mold-clamping devices including actuators each positioned in an outer end portion of a respective one of said first and second mold-clamping devices in the first linear direction and being configured to open and close said first and second pairs of mold halves symmetrical to each other in the first linear direction by a respective one of the actuators, the first and second mold-clamping devices being configured to move the first and second pairs of mold halves, respectively, in a second linear direction perpendicular to the first linear direction such that the first and second pairs of mold halves are positioned below extrubing extruding device;

a single main base plate configured to reciprocate in the first linear direction to alternately align the first and second pairs of mold halves with said extruding device in said second linear direction such that the first and second mold-clamping devices move and position the first and second pairs of mold halves below the extruding device, respectively; and first and second hammering devices configured to hammer blow pins into said first and second pairs of mold halves, respectively.

2. The blow molding machine according to claim 1, wherein:

said first and second hammering devices are each supported by at least one of plural tie bars and plural platens in each of said first and second mold-clamping devices; and said first and second hammering devices are configured to hammer said blow pins respectively into said first and second pairs of mold halves from underneath said first and second pairs of mold halves, respectively.

3. A blow molding machine comprising:

an extruding device configured to extrude a parison;

first and second mold-clamping devices configured to clamp first and second pairs of mold halves, respectively, and positioned in a first linear direction, said first and second mold-clamping devices including actuators each positioned in an outer end portion of a respective one of said first and second mold-clamping devices in the first linear direction and being configured to open and close said first and second pairs of mold halves symmetrical to each other in the first linear direction by a respective one of the actuators, the first and second mold-clamping devices being configured to move the first and second pairs of mold halves, respectively, in a second linear direction perpendicular to the first linear direction such that the first and second pairs of mold halves are positioned below the extruding device;

a single main base plate configured to reciprocate in the first linear direction to alternately align the first and second pairs of mold halves with said extruding device in said second linear direction such that the first and second mold-clamping devices move and position the first and second pairs of mold halves below the extruding device, respectively; and an adjustment mechanism provided in each of said first and second mold-clamping devices and configured to adjust clamping of a respective one of said first and second mold-clamping devices in accordance with at least one of a size and a shape of said first and second pairs of mold halves;

first and second hammering devices configured to hammer blow pins into said first and second pairs of mold halves, respectively.

4. The blow molding machine according to claim 3, wherein:

said first and second mold-clamping devices each comprise a crank mechanism configured to expand linearly; and said adjustment mechanism adjusts the clamping by altering an expanding length of said crank mechanism.

5. The blow molding machine according to claim 4, wherein said crank mechanism comprises a plurality of linkages.

6. The blow molding machine according to claim 3, further comprising an in-mold labeler configured to perform an in-mold labeling operation.

7. The blow molding machine according to claim 3, further comprising a taking-out device configured to take out a molded product after a molding operation.

8. The blow molding machine according to claim 3, wherein:

said first and second mold-clamping devices each comprises at least one of plural tie bars and plural platens; and said first and second hammering devices are each supported by said at least one of plural tie bars and plural platens in a respective one of said first and second mold-clamping devices.

9. A blow molding machine comprising:

an extruding device configured to extrude a parison;

mold-clamping means for opening and closing first and second pairs of mold halves symmetrical to each other, respectively, in a first linear direction, said mold-clamping means being configured to move the first and second pairs of mold halves independently in a second linear direction perpendicular to the first linear direction such that the first and second pairs of mold halves are positioned below the extruding device;

reciprocating means for reciprocating the mold-clamping means in the first linear direction and alternately aligning the first and second pairs of mold halves with said extruding device in said second linear direction such that the mold-clamping means moves and positions the first and second pairs of mold halves below the extruding device, respectively; and hammering means for hammering a pin into a respective one of the pair of molds for blowing.

10. The blow molding machine according to claim 1, wherein each of said first and second mold-clamping devices comprises a plurality of tie bars provided in parallel, a front platen provided on one end portion of the tie bars, and a movable platen provided on the tie bars and configured to move along the tie bars toward the front platen, wherein the front and movable platens hold a respective one of the first and second pairs of mold halves and said first and second mold-clamping devices are symmetrically positioned on the single main base plate such that the front platens of the first and second mold-clamping devices face back to back.

11. The blow molding machine according to claim 3, wherein each of said first and second mold-clamping devices comprises a plurality of tie bars provided in parallel, a front platen provided on one end portion of the tie bars, and a movable platen provided on the tie bars and configured to move along the tie bars toward the front platen, wherein the front and movable platens hold a respective one of the first and second mold halves and said first and second mold-clamping devices are symmetrically positioned on the single main base plate such that the front platens of the first and second mold-clamping devices face back to back.

* * * * *

UNITED STATES PATENT AND TRADEMARK OFFICE
CERTIFICATE OF CORRECTION

PATENT NO. : 6,499,988 B1
DATED : December 31, 2002
INVENTOR(S) : Miura et al.

It is certified that error appears in the above-identified patent and that said Letters Patent is hereby corrected as shown below:

<u>Title page,</u>
Item [45], and the [*]Notice information should read as follows:
-- [45] Date of Patent: *Dec. 31, 2002
  [*] Notice:   This patent issued on a continued prosecution application filed under 37 CFR 1.53(d), and is subject to the twenty year patent term provisions of 35 U.S.C 154(a)(2).--.

Subject to any disclaimer, the term of this patent is extended or adjusted under 35 U.S.C. 154(b) by 0 days.      --

Signed and Sealed this

Twentieth Day of May, 2003

JAMES E. ROGAN
*Director of the United States Patent and Trademark Office*